US012151456B2

(12) United States Patent
Lee et al.

(10) Patent No.: US 12,151,456 B2
(45) Date of Patent: Nov. 26, 2024

(54) HARD COATING LAMINATE

(71) Applicant: LG CHEM, LTD., Seoul (KR)

(72) Inventors: Eun Seon Lee, Daejeon (KR); Ha Neul Kim, Daejeon (KR); Seungil Baek, Daejeon (KR); Woo Han Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 657 days.

(21) Appl. No.: 16/973,339

(22) PCT Filed: Oct. 25, 2019

(86) PCT No.: PCT/KR2019/014201
§ 371 (c)(1),
(2) Date: Dec. 8, 2020

(87) PCT Pub. No.: WO2020/091321
PCT Pub. Date: May 7, 2020

(65) Prior Publication Data
US 2021/0245483 A1    Aug. 12, 2021

(30) Foreign Application Priority Data

Oct. 31, 2018   (KR) .................. 10-2018-0132342
Oct. 22, 2019   (KR) .................. 10-2019-0131740

(51) Int. Cl.
B32B 27/28      (2006.01)
B32B 27/08      (2006.01)
B32B 27/36      (2006.01)
C08G 77/14      (2006.01)
C08G 77/20      (2006.01)

(52) U.S. Cl.
CPC ............ *B32B 27/283* (2013.01); *B32B 27/08* (2013.01); *B32B 27/36* (2013.01); *C08G 77/14* (2013.01); *C08G 77/20* (2013.01); *B32B 2250/02* (2013.01); *B32B 2255/10* (2013.01); *B32B 2255/26* (2013.01); *B32B 2307/536* (2013.01); *B32B 2307/558* (2013.01); *B32B 2307/732* (2013.01); *B32B 2367/00* (2013.01); *B32B 2383/00* (2013.01); *B32B 2457/20* (2013.01)

(58) Field of Classification Search
CPC ....... B32B 27/283; B32B 27/08; B32B 27/36; B32B 2250/02; B32B 2255/10; B32B 2255/26; B32B 2307/536; B32B 2307/558; B32B 2307/732; B32B 2367/00; B32B 2383/00; B32B 2457/20; C08G 77/14; C08G 77/20
See application file for complete search history.

(56) References Cited

U.S. PATENT DOCUMENTS

| | | | |
|---|---|---|---|
| 5,276,108 A * | 1/1994 | Furukawa | ........... C08F 283/004 525/450 |
| 9,403,991 B2 | 8/2016 | Kang et al. | |
| 9,567,479 B2 | 2/2017 | Kang et al. | |
| 9,701,862 B2 | 7/2017 | Kang et al. | |
| 9,778,398 B2 | 10/2017 | Kang et al. | |
| 9,783,698 B2 | 10/2017 | Kang et al. | |
| 9,884,977 B2 | 2/2018 | Kang et al. | |
| 9,896,597 B2 | 2/2018 | Kang et al. | |
| 9,902,868 B2 | 2/2018 | Kang et al. | |
| 9,909,026 B2 | 3/2018 | Kang et al. | |
| 9,926,461 B2 | 3/2018 | Kang et al. | |
| 10,000,655 B2 | 6/2018 | Kang et al. | |
| 10,087,340 B2 | 10/2018 | Kang et al. | |
| 10,294,387 B2 | 5/2019 | Kang et al. | |
| 10,329,385 B2 | 6/2019 | Woo et al. | |
| 10,377,919 B2 | 8/2019 | Bae et al. | |
| 2007/0265427 A1* | 11/2007 | Takai | ............. H01L 23/293 257/E31.118 |
| 2013/0344320 A1* | 12/2013 | Ogata | ............. B32B 27/08 428/335 |
| 2015/0159044 A1* | 6/2015 | Bae | ............. C08G 59/3281 523/435 |
| 2016/0297933 A1 | 10/2016 | Kuwana et al. | |
| 2017/0324059 A1 | 11/2017 | Choi et al. | |
| 2018/0142128 A1 | 5/2018 | Kikuchi | |
| 2018/0282485 A1 | 10/2018 | Kuwana et al. | |
| 2018/0361719 A1* | 12/2018 | Kikuchi | ............. B32B 27/28 |
| 2019/0292342 A1 | 9/2019 | Kikuchi | |

FOREIGN PATENT DOCUMENTS

| | | |
|---|---|---|
| CN | 107709401 A | 2/2018 |
| JP | 2009-197078 A | 9/2009 |
| JP | 2015112599 A | 6/2015 |
| JP | 2015-212353 A | 11/2015 |
| JP | 2016188354 A | 11/2016 |
| JP | 2018501976 A | 1/2018 |
| JP | 2018083915 A | 5/2018 |
| KR | 10-2013-0135154 A | 12/2013 |
| KR | 10-2015-0068240 A | 6/2015 |
| KR | 10-1546729 B1 | 8/2015 |
| KR | 10-2016-0020614 A | 2/2016 |
| KR | 10-2016-0067319 A | 4/2016 |
| KR | 10-2016-0115612 A | 10/2016 |

(Continued)

OTHER PUBLICATIONS

International Search Report issued for International Application No. PCT/KR2019/014201 on Feb. 11, 2020, 4 pages.

*Primary Examiner* — Travis M Figg
(74) *Attorney, Agent, or Firm* — ROTHWELL, FIGG, ERNST & MANBECK, P.C.

(57) ABSTRACT

The present disclosure relates to a hard coating laminate having an internal bending property and an external bending property including: a supporting substrate layer containing a thermoplastic resin; and a hard coating layer having a thickness of 50 to 240 μm, wherein the hard coating layer includes a cured product of a resin composition including a siloxane resin having a predetermined glycidoxypropyl modified silicone structure and an elastomeric polymer.

12 Claims, No Drawings

(56) References Cited

FOREIGN PATENT DOCUMENTS

| | | |
|---|---|---|
| KR | 10-2017-0000065 A | 1/2017 |
| KR | 10-2017-0106505 A | 9/2017 |
| KR | 10-2018-0019115 A | 2/2018 |
| KR | 10-2018-0019117 A | 2/2018 |
| WO | 2016203957 A1 | 12/2016 |
| WO | 2018159285 A1 | 9/2018 |

* cited by examiner

HARD COATING LAMINATE

CROSS-REFERENCE TO RELATED APPLICATION(S)

This application is a 35 U.S.C. 371 National Phase Entry Application from PCT/KR2019/014201, filed on Oct. 25, 2019, designating the United States, which claims priority to or the benefit of Korean Patent Application No. 10-2018-0132342 filed with the Korean Intellectual Property Office on Oct. 31, 2018, and Korean Patent Application No. 10-2019-0131740 filed with the Korean Intellectual Property Office on Oct. 22, 2019, the disclosures of which are incorporated herein by reference in their entirety.

TECHNICAL FIELD

The present disclosure relates to a hard coating laminate exhibiting high pencil hardness and having excellent adhesiveness, impact resistance, external bending property and internal bending property.

BACKGROUND OF THE INVENTION

With recent advancements of mobile devices such as smartphones and tablet PC, substrates for displays have recently been required to become lighter and slimmer. Display windows or front panels of such mobile devices are generally made of glass or reinforced glass both of which have excellent mechanical properties. However, the glass may be problematic as it becomes the cause of increasing the weight of the mobile devices due to the weight of glass itself and can be broken by an external impact.

In this regard, the research for plastic resin is actively underway as a material which can replace the glass. A plastic resin composition is lightweight and less fragile, and thus is suitable for the trend of pursuing lighter mobile devices. In particular, in order to achieve a composition having high hardness and abrasion resistance characteristics, compositions for coating a hard coating layer onto a supporting substrate have been proposed.

In addition, as the hard coating film required for a foldable display material, an acrylate-based resin capable of UV curing is mainly used. However, the acrylate-based resin has high setting shrinkage and severe curl and thus, double-sided coating or thin coating should be performed.

By the way, in this case, it is advantageous in terms of internal bending, but there is a difficulty in securing impact resistance and scratch resistance for use as a display material, in particular a hard cover.

Furthermore, as an approach to improving the surface hardness of the hard coating layer, a method of increasing the thickness of the hard coating layer may be considered. In order to secure the surface hardness to replace the glass it is necessary to implement a constant thickness of the hard coating layer.

However, as the thickness of a hard coating layer increases, the surface hardness can increase, but it is prone to setting shrinkage which leads to the generation of wrinkling or curling and external bending properties are poor, so that the thick hard coating layers are likely to be cracked or peeled off and are difficult to employ in practice.

BRIEF SUMMARY OF THE INVENTION

The present disclosure provides a hard coating laminate which not only exhibits high pencil hardness but also has excellent adhesiveness, impact resistance and bending properties and thus is suitable for application to a foldable display material.

The present disclosure provides a hard coating laminate having an internal bending property and an external bending property including:

a supporting substrate layer; and a hard coating layer which is formed on the supporting substrate layer and which has a thickness of 50 to 240 µm, wherein the hard coating layer includes a cured product of a resin composition including a siloxane resin and an elastomeric polymer, wherein the elastomeric polymer is contained in an amount of 20 to 80 parts by weight based on 100 parts by weight of the siloxane resin, and wherein the siloxane resin comprises 70 mol % or more of a repeating unit represented by the following Chemical Formula 1 based on 100 mol % (total molar content ratio) of the units constituting the total siloxane resin, $$-(R^1SiO_{3/2})a-\qquad\text{[Chemical Formula 1]}$$

(in Chemical Formula 1, $R^1$ is a functional group represented by the following Chemical formula a, and a is a positive number,

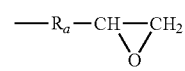

[Chemical Formula a]

(in Chemical Formula a, $R_a$ is a substituted or unsubstituted alkylene group having 1 to 6 carbon atoms, or $—R_bOR_c—$ where $R_b$ and $R_c$ are each independently a single bond or a substituted or unsubstituted alkylene group having 1 to 6 carbon atoms)

DETAILED DESCRIPTION OF THE INVENTION

Hereinafter, a hard coating laminate using the hard coating composition according to specific embodiments of the present invention will be described in more detail.

However, these embodiments are given by way of illustration only and the scope of the invention is not limited thereby, and it will be apparent to those skilled in the art that various changes and modifications can be made to the embodiments within the scope and sprit of the present disclosure.

Unless otherwise specified throughout this specification, the technical terms used herein are only for reference to specific embodiments and is not intended to limit the present invention.

The singular forms "a", "an", and "the" used herein include plural references unless the context clearly dictates otherwise.

The term "including" or "comprising" used herein specifies a specific feature, region, integer, step, action, element and/or component, but does not exclude the addition of a different specific feature, area, integer, step, action, element, component and/or group.

As used herein, the weight average molecular weight refers to a weight average molecular weight (unit: g/mol) in terms of polystyrene measured by GPC method. In the process of measuring the weight average molecular weight in terms of polystyrene measured by GPC method, a detector and an analytical column, such as a commonly known analysis apparatus and differential refractive index detector can be used, and commonly applied temperature conditions, solvent, and flow rate can be used. Specific examples of the measurement conditions include a temperature of 35° C., a chloroform solvent and a flow rate of 1 mL/min.

In addition, in the present invention, the hard coating film may mean a hard coating layer including a cured product formed using the hard coating composition. Further, the hard coating composition includes a resin composition containing a siloxane resin and an elastomeric polymer.

According to one embodiment of the present disclosure, there can be provided a hard coating laminate having an internal bending property and an external bending property including: a supporting substrate layer; and a hard coating layer which is formed on the supporting substrate layer and which has a thickness of 50 to 240 μm, wherein the hard coating layer includes a cured product of a resin composition including a siloxane resin and an elastomeric polymer, wherein the elastomeric polymer is contained in an amount of 20 to 80 parts by weight based on 100 parts by weight of the siloxane resin, and wherein the siloxane resin includes 70 mol % or more of a repeating unit represented by the following Chemical Formula 1 based on 100 mol % (total molar content ratio) of the units constituting the total siloxane resin,

  [Chemical Formula 1]

(in Chemical Formula 1, $R^1$ is a functional group represented by the following Chemical formula a, and a is a positive number,

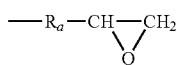  [Chemical Formula a]

(in Chemical Formula a, $R_a$ is a substituted or unsubstituted alkylene group having 1 to 6 carbon atoms, or —$R_b OR_c$— where $R_b$ and $R_c$ are each independently a single bond or a substituted or unsubstituted alkylene group having 1 to 6 carbon atoms)

If the hard coating layer realizes a hardness of 5H or more, it can ensure excellent rigidity in manufacturing a foldable display device. However, a conventional hard coating film has a hardness of 5H or more, but it is difficult to secure impact resistance and scratch resistance.

Thus, in one embodiment of the present disclosure, it is possible to apply both single-sided coating and two or more-layer coating (for example, two-layer coating on one surface) or double-sided coating. It is intended to provide a hard coating composition that can ensure excellent mechanical properties even when these coatings proceed, and a hard coating laminate including a hard coating film formed using the same. The hard coating laminate may include the meaning of a hard coating film. Thus, the hard coating laminate of the present invention may include one or more hard coating layers on at least one side of the supporting substrate layer, but more preferably, the hard coating laminate may have a structure including a hard coating layer of the single-side coating formed on the supporting substrate layer. Therefore, most preferably, the hard coating laminate is capable of forming a thick-film type hard coating layer after performing single-sided coating on a substrate, thereby realizing only high pencil hardness but also an effect of improving adhesiveness, internal and external bending properties, and the like.

Preferably, the hard coating laminate may be formed using, as a hard coating composition, a resin composition including a siloxane resin having a glycidoxypropyl modified silicone structure including the silsesquioxane repeating unit of Chemical Formula 1 and the elastomeric polymer. The hard coating layer (that is, the hard coating film) including a cured product of the resin composition including the aforementioned two components has a high pencil hardness of 5H or more, and also it is possible to provide excellent effects in terms of impact resistance, external and internal bending properties without deteriorating adhesiveness and scratch resistance.

More preferably, the siloxane resin having the glycidoxypropyl modified silicone structure includes a compound represented by the following Chemical Formula 2.

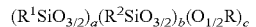  [Chemical Formula 2]

(in Chemical Formula 2,

R is hydrogen atom or an alkyl group having 1 to 20 carbon atoms, $R^1$ is a functional group represented by the following Chemical Formula a,

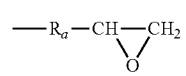  [Chemical Formula a]

in Chemical Formula a, $R_a$ is a substituted or unsubstituted alkylene group having 1 to 6 carbon atoms, or —$R_b OR_c$— where $R_b$ and $R_c$ are each independently a single bond, or a substituted or unsubstituted alkylene group having 1 to 6 carbon atoms, a repeating unit including a substituent of $R^1$ includes in an amount of 70 mol % or more, based on the total molar content ratio of Chemical Formula 2, $R^2$ is selected from the group consisting of a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group, a hydrogen atom, an amino group, a mercapto group, an ether group, an ester group, a carbonyl group, a carboxyl group and a sulfone group, and a/(a+b)≥0.7, where a is a positive number and b and c are each independently or simultaneously 0 or a positive number.)

In addition, the hard coating laminate may have high impact resistance, internal bending property and external bending property, even while including a hard coating layer having a thickness of a certain level or more relative to the supporting substrate layer. The ratio of the thickness of the hard coating layer to the supporting substrate layer is not largely limited, but for example, the thickness of the hard coating layer relative to the supporting substrate layer may be 25% or more, or 30% or more or 25% to 100%.

More preferably, the hard coating laminate may include a hard coating layer having a thickness of 50 μm or more, for example, about 50 to about 240 μm, or about 70 to about 200 μm, or about 50 μm to about 150 μm, or about 70 to about 150 μm.

That is, in the hard coating laminate, since a thick-film coating is possible by the hard coating composition containing the siloxane resin and the elastomeric polymer, an increase in thickness of 100 μm or more can be expected. Accordingly, one embodiment of the present invention can provide a laminate including a hard coating layer having good adhesiveness, impact resistance, internal bending property, and external bending property while having high pencil hardness (5H or more) by implementing a thick-film type. In addition, it is possible to provide a laminate including a hard coating layer which is advantageous in the internal bending property while improving impact resistance by increasing the overall thickness through double-sided coating.

When the thickness of the hard coating layer is 50 μm or less in the hard coating laminate, there is a problem that impact resistance may be deteriorated. When the thickness is 240 μm or more, there is a problem that crack resistance is lowered by hard coating. In other words, by using the hard coating composition, it satisfies not only the range of thickness exhibiting excellent mechanical properties but also both internal bending property and external bending property as compared with the conventional case, thereby providing a laminate including a hard coating layer having excellent bending durability.

Herein, in order to evaluate the flexibility of the hard coating laminate, it is possible to evaluate the internal bending property and the external bending property by observing the appearance when the supporting substrate layer or the surface coated on the lower part is folded inward for each radius by using a dynamic folding machine tester.

Specifically, the hard coating laminate according to the present disclosure has an internal bending property which cracks do not occur when 200,000 times repeated folding and unfolding motions at 25° C. to the inside of the surface formed with the hard coating layer at an angle of 90 degrees so that the surface formed with the hard coating layer faces based on the middle of the hard coating laminate.

In addition, the hard coating laminate according to the present disclosure has an external bending property which cracks do not occur when 200,000 times repeated folding and unfolding motions at 25° C. to the outside of the surface formed with the hard coating layer at 90 degrees so that the surface coated on the supporting substrate layer for hard coating layer formation or the lower part thereof faces inwardly based on the middle of the hard coating laminate.

According to one embodiment, in the evaluation of the internal bending properties, when the hard coating layer is formed only on one surface of the supporting substrate layer in the hard coating laminate, folding and unfolding motions repeated 200,000 times at 25° C. so that the surface formed with the hard coating layer was folded inward, and then the inner curvature radius R of the folded part was measured to confirm whether cracks occurred, thereby evaluating the internal bending properties.

In addition, when a coating layer is formed on both sides of a supporting substrate layer, folding and unfolding motions repeated 200,000 times at 25° C. so that the upper coating layer was folded inward and then the inner curvature radius R of the folded part was measured to confirm whether cracks occurred, thereby evaluating the internal bending properties.

More specifically, the hard coating laminate of the embodiment may have an internal bending property which cracks do not occur when 200,000 times repeated folding and unfolding motions at 25° C. to the inside of the hard coating layer at 90 degrees so that the hard coating layer faces at intervals of 5 mm (to have a radius of 2.5 mm) at the middle of the hard coating laminate using a dynamic folding machine tester.

Further, when the hard coating layer is formed only on one surface of the supporting substrate layer, the hard coating laminate of the embodiment may have an external bending property which cracks do not occur when 200,000 times repeated folding and unfolding motions at 25° C. to the outside of the hard coating layer at 90 degrees so that the surface coated on the supporting substrate layer for hard coating layer formation or the lower part thereof faces inward at a predetermined interval, for example, at intervals of 8 mm at the middle of the hard coating laminate using a dynamic folding machine tester.

Further, when a coating layer is formed on both sides of a supporting substrate layer, the hard coating laminate of the embodiment may have an external bending property which cracks do not occur when 200,000 times repeated folding and unfolding motions at 25° C. to the outside of the upper hard coating layer at an angle of 90 degrees so that the lower coating layer of the supporting substrate layer faces inward at a predetermined interval, for example, at intervals of 8 mm at the middle of the hard coating laminate using a dynamic folding machine tester.

For the hard coating laminate of the embodiment, the durability against bending can be measured by a method of 200,000 times repeatedly folding and unfolding both sides of the hard coating laminate at an angle of 90 degrees with respect to the bottom surface at 25° C. at a rate of about 1 to about 3 times/sec. Herein, in case of the internal bending property, the test is carried out so as to be folded toward the surface on which the hard coating layer is formed, and in the case of the external bending property, the test can be carried out so as to be folded toward the supporting substrate layer which is the opposite side of the hard coating layer.

In the measurement of such durability, the hard coating laminate of the present invention does not generate cracks of 1 cm or more or 5 mm or more even after being bent 200,000 times, and does not substantially generate cracks.

Therefore, the hard coating laminate can be suitably applied for a foldable display because even in actual application conditions such as repeatedly folding, rolling or warping, the possibility of occurrence of cracks is extremely low.

In addition, in the hard coating composition, the siloxane resin is a compound represented by Chemical Formula 2 containing the repeating unit of Chemical Formula 1, and may be an epoxy polysiloxane. According to the definition of Chemical Formula 2, mechanical properties such as hardness and rigidity may be improved and excellent internal and external bending properties may be secured.

Specifically, in Chemical Formula 1, $R^1$ is a functional group including a substituent represented by Chemical Formula a containing 70 mol % or more based on the total molar content ratio of the total siloxane resin.

As the functional group of Chemical Formula a is included in the repeating unit $(R^1SiO_{3/2})$ at the end of Chemical Formula 2, it is possible to provide a hard coating layer having excellent adhesiveness, impact resistance and bending properties while having high pencil hardness by implementing a thick-film type.

More specifically, in Chemical Formula 1, the $(R^1SiO_{3/2})$ includes a silsesquioxane structural unit. Further, in Chemical Formula a, $R_a$ may be specifically a substituted or unsubstituted alkylene group having 1 to 6 carbon atoms, or —$R_bOR_c$—. More specifically, $R_a$ may be methylene, ethylene, or propylene. Further, the $R_b$ to Re may be each independently a single bond or a substituted or unsubstituted alkylene group having 1 to 6 carbon atoms, and more specifically, it may be a single bond or a linear alkylene group having 1 to 6 carbon atoms such as methylene, ethylene, propylene, butylene or the like. Still more specifically, the $R_a$ may be methylene, ethylene, or —$R_aOR_b$— where $R_a$ and $R_b$ may be a direct bond or a linear alkylene group having 1 to 6 carbon atoms or 1 to 3 carbon atoms such as methylene and propylene.

More specifically, in Chemical Formula 1, the ($R^1SiO_{3/2}$) includes a silsesquioxane structural unit. Further, in Chemical Formula a, $R_a$ may be specifically a substituted or unsubstituted alkylene group having 1 to 6 carbon atoms, or —$R_bOR_c$—. More specifically, $R_a$ may be methylene, ethylene, propylene or —$R_bOR_c$—. In this case, $R_b$ to $R_c$ may be each independently a single bond or a substituted or unsubstituted alkylene group having 1 to 3 carbon atoms.

In consideration of the effect of improving the surface hardness and curing properties of the cured product, the $R^1$ is a glycidyl group, or $R_a$ of Chemical Formula 2 is —$R_bOR_c$— where $R_b$ may be an alkylene having 1 to 3 carbon atoms, and $R_c$ may be methylene. Most preferably, the $R^1$ includes a glycidoxy group, and may be, for example, a glycidoxypropyl group.

Further, when $R_a$ is substituted, specifically, it may be substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxy group, an alkoxy group having 1 to 12 carbon atoms, an amino group, an acrylic group (or acryloyl group), a methacryl group (or methacryloyl group), an acrylate group (or acryloyloxy group), a methacrylate group (or methacryloyloxy group), a halogen group, a mercapto group, an ether group, an ester group, an acetyl group, a formyl group, a carboxyl group, a nitro group, a sulfonyl group, an urethane group, an epoxy group, an oxetanyl group and a phenyl group. More specifically, it may be substituted with one or more substituents selected from the group consisting of an alkyl group having 1 to 6 carbon atoms such as methyl and ethyl; an acrylic group; a methacryl group; an acrylate group; a methacrylate group; a vinyl group; al allyl group; an epoxy group; and an oxetanyl group.

In addition, Chemical Formula 2 may further include a silsesquioxane unit of ($R^2SiO_{3/2}$) together with the silsesquioxane unit of Chemical Formula 1 of the ($R^1SiO_{3/2}$). The silsesquioxane unit of ($R^2SiO_{3/2}$) may increase the curing density of the siloxane resin and thus improve the surface hardness characteristics of the coating layer.

In the silsesquioxane structural unit of the ($R^2SiO_{3/2}$), $R^2$ may be specifically selected from the group consisting of a substituted or unsubstituted alkyl group having 1 to 12 carbon atoms, a substituted or unsubstituted cycloalkyl group having 3 to 12 carbon atoms, a substituted or unsubstituted aryl group having 6 to 12 carbon atoms, a substituted or unsubstituted arylalkyl group having 7 to 12 carbon atoms, a substituted or unsubstituted alkylaryl group having 7 to 12 carbon atoms, an epoxy group, an oxetanyl group, an acrylate group, a methacrylate group and a hydrogen atom.

In addition, the $R^2$ may be substituted with one or more substituents selected from the group consisting of an alkyl group having 1 to 12 carbon atoms, a cycloalkyl group having 3 to 12 carbon atoms, an alkenyl group having 2 to 12 carbon atoms, a hydroxy group, an alkoxy group having 1 to 12 carbon atoms, an amino group, an acrylic group, a methacryl group, an acrylate group, a methacrylate group, a halogen group, a mercapto group, an ether group, an ester group, an acetyl group, a formyl group, a carboxyl group, a nitro group, a sulfonyl group, an urethane group, an epoxy group, an oxetanyl group and a phenyl group. More specifically, it may be substituted with one or more substituents selected from the group consisting of an acrylic group, a methacryl group, an acrylate group, a methacrylate group, a vinyl group, an allyl group, an epoxy group and an oxetanyl group.

Among these, in terms of being able to further increase the curing density of the siloxane resin and further improve the surface hardness characteristics of the coating layer, the $R^2$ may be, more specifically, an alkyl group having 1 to 6 carbon atoms or a phenyl group having 6 carbon atoms which is unsubstituted or substituted with one or more substituents selected from the group consisting of an acrylic group, a methacryl group, an acrylate group, a methacrylate group, a vinyl group, an allyl group, an epoxy group and an oxetanyl group; or an epoxy group; or an oxetanyl group. Still more specifically, the $R^2$ may be an unsubstituted phenyl group or epoxy group.

Meanwhile, in the present invention, the 'epoxy group' is a functional group containing an oxirane ring, and unless otherwise stated, it includes an unsubstituted epoxy group containing only an oxirane ring, an alicyclic epoxy group having 6 to 20 carbon atoms or 6 to 12 carbon atoms (e.g., epoxycyclohexyl, epoxycyclopentyl, etc.); and an aliphatic epoxy group having 3 to 20 carbon atoms or 3 to 12 carbon atoms (glycidyl groups, etc.). However, when the $R^2$ is an epoxy group, those identical with the functional groups represented by Chemical Formula 2 are excluded.

Further, in the present invention, the "oxetanyl group" is a functional group containing an oxetane ring, and unless otherwise stated, it includes an unsubstituted oxetanyl group containing only an oxetane ring, an alicyclic oxetanyl group having 6 to 20 carbon atoms or 6 to 12 carbon atoms, and an aliphatic oxetanyl group having 3 to 20 carbon atoms or 3 to 12 carbon atoms.

Moreover, the siloxane resin can contain a structural unit of (OR). By including the structural unit, it is possible to improve flexibility while maintaining excellent hardness characteristics. The R may be, specifically, a hydrogen atom or an alkyl group having 1 to 20 carbon atoms or 1 to 12 carbon atoms, and more specifically, hydrogen atom, or a linear or branched alkyl group having 1 to 4 carbon atoms such as a methyl group, an ethyl group, a propyl group, an isopropyl group, a butyl group and an isobutyl group. Preferably, in Chemical Formula 1, R is hydrogen or an alkyl group having 1 to 3 carbon atoms, $R^1$ includes a glycidoxypropyl group, and $R^2$ may be an alkyl group having 1 to 10 carbon atoms, an aryl group or an epoxy group having 6 to 20 carbon atoms.

The siloxane resin containing the aforementioned structural unit may be prepared by hydrolysis and condensation reaction of siloxane monomers of each structural unit, specifically, alkoxysilanes having a functional group of Chemical Formula 2 alone, or between such alkoxysilanes and different types of alkoxysilanes. Herein, the molar ratio of each structural unit may be controlled through control of the content ratio of the alkoxysilane. Specifically, in Chemical Formula 1, a, b, and c each represent a molar ratio of ($R^1SiO_{3/2}$) units, ($R^2SiO_{3/2}$) units, and (OR) units constituting the siloxane resin. In the siloxane resin of Chemical Formula 1 composed of such molar ratios, $a/(a+b) \geq 0.7$ where a is a positive number, b and c may be each independently or simultaneously 0 or a positive number.

Further, the siloxane resin, which is a compound represented by Chemical Formula 2, may include 70 mol % or more of a repeating unit represented by Chemical Formula 1 containing a substituent of $R^1$ based on 100 mol % (total molar content ratio) of the units constituting the siloxane resin. Therefore, the siloxane resin of the present invention can contribute to the improvement of mechanical properties of the hard coating laminate including the hard coating layer.

As a more preferred example, the siloxane resin, which is a compound represented by Chemical Formula 2, may include 70 mol % to 100 mol % of a repeating unit represented by Chemical Formula 1 containing a substituent of $R^1$ based on 100 mol % (total molar content ratio) of the units constituting the siloxane resin. In the siloxane resin, when the molar content of the repeating unit containing the substituent of $R^1$ is 70 mol % or less, there is a problem that impact resistance is lowered. In other words, when the molar content of the structural unit is less than 70 mol %, it is difficult to exhibit sufficient surface hardness of the hard coating layer due to a decrease in the curing density.

Herein, the repeating unit containing the substituent of $R^1$ means including a structural unit of $(R^1SiO_{3/2})$, which means including 70 mol % or more, more specifically 70 mol or more and 100 mol % or less based on 100 mol % of the total amount of the units constituting the siloxane resin. In this case, when the hard coating layer is formed, the curing density is increased as compared with the conventional case, and as a result, the hard coating film may exhibit a significantly improved surface hardness.

According to another preferred embodiment, the siloxane resin of Chemical Formula 1 may include at least 70 mol % or more, or 70 mol % to 100 mol % of glycidoxypropyl-modified silicone in the structure. The siloxane resin of Chemical Formula 1 may be prepared through condensation polymerization of siloxane monomers of each repeating unit, and the condition is not limited as long as it causes to contain at least 70 mol % or more of the $(R^1SiO_{3/2})$ structure containing the functional group of Chemical Formula 2.

The siloxane resin of Chemical Formula 1 may have a weight average molecular weight (Mw) of 1,000 to 50,000 g/mol.

In particular, the hard coating composition of the present invention can improve warpage properties, and also improve bending properties of the hard coating laminate including a hard coating layer by using a specific content of an elastomeric polymer that serves to impart flexibility.

The hard coating composition may include 20 to 80 parts by weight of an elastomeric polymer with respect to 100 parts by weight of the siloxane resin.

Preferably, the elastomeric polymer may include 20 to 70 parts by weight or 20 to 50 parts by weight with respect to 100 parts by weight of the siloxane resin. When the content of the elastomeric polymer is 20 parts by weight or less, there is a problem that it is insufficient to implement the physical properties of the elastomeric polymer, and when the content is 80 parts by weight or more, there is a problem that it is difficult to ensure high hardness.

The elastomeric polymer may include one or more selected from the group consisting of alkanediol, polyolefin polyol, polyester polyol, polycaprolactone polyol, polyether polyol and polycarbonate polyol.

In particular, the elastomeric polymer may be obtained by ring-opening polymerization of caprolactone or a reaction using a small amount of diol, triol or amine as an initiator. In one embodiment, the elastomeric polymer is a polycaprolactone polyol represented by Chemical Formula 3 formed by a ring-opening polymerization reaction as shown in Reaction Scheme 1 below.

[Reaction Scheme 1]

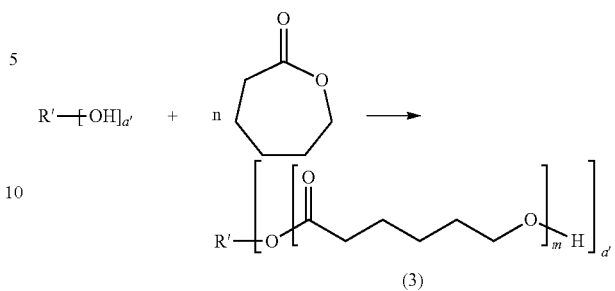

(in Reaction Scheme 1, R' is an alkylene group having 2 to 6 carbon atoms, a' is an integer of 2 to 4, n is an integer of 1 to 20, and n=m*a') However, when providing the elastomeric polymer, the R' substituent is not limited to Reaction Scheme 1, and as long as it is a compound that utilizes a form in which both ends have hydroxy groups (—OH), the type thereof can be used without limitation.

In such a method of the present invention, a more specific example may be polycaprolactonediol.

Therefore, in a most preferred embodiment, considering the remarkable improvement effect due to the combination with the siloxane resin of Chemical Formula 2, the elastomeric polymer may include a polycaprolactone polyol of Mn 300 or more and Mn 10,000 or less.

Further, the hard coating composition may further include an initiator, or an initiator and an organic solvent.

The content of the initiator may be 0.1 to 10 parts by weight with respect to 100 parts by weight of the siloxane resin. Preferably, the initiator may be used in an amount of about 0.5 to 5 parts by weight or 1 to 2 parts by weight with respect to 100 parts by weight of the siloxane resin. When the content of the initiator is less than 0.1 part by weight, only surface curing may occur or epoxy curing may not occur sufficiently, resulting in low hardness. On the other hand, when the content of the initiator exceeds 10 parts by weight, it may cause cracking and peeling of the hard coating layer due to the fast curing rate The initiator may be a photopolymerization or thermal polymerization initiator well known in the art, and the type thereof is not particularly limited. For example, the photopolymerization initiator may be a cationic polymerization initiator which is a sulfonium salt compound well known in the art. Further, the photopolymerization initiator may include one or more selected from the group consisting of an aryl sulfonium hexafluoroantimonate salt, an aryl sulfonium hexafluorophosphate salt, a diphenyldiodonium hexafluorophosphate salt, a diphenyldiodonium hexaantimonate salt, a ditolyliodonium hexafluorophosphate salt and a 9-(4-hydroxyethoxyphenyl)thianthrenium hexafluorophosphate salt, but may not be limited thereto. The thermal polymerization initiator may include one or more selected from the group consisting of a 3-methyl-2-butenyltetramethylenesulfonium hexafluoroantimonate salt, an ytterbium trifluoromethenesulfonate salt, a samarium trifluoromethenesulfonate salt, an erbium trifluoromethenesulfonate salt, a dysprosium trifluoromethenesulfonate salt, a lanthanum trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole and 2-ethyl-4-methylimidazole, but may not be limited thereto.

In addition, the hard coating laminate may be formed in a solvent-free manner when there is no problem in the process. And, in order to adjust the viscosity and fluidity of the hard coating composition used to form the hard coating laminate, and to increase the applicability of the composition to the supporting substrate, it may optionally further include an organic solvent.

When the organic solvent is further included in the hard coating composition, as the organic solvent, alcohol based solvents such as methanol, ethanol, isopropyl alcohol, or butanol, alkoxy alcohol based solvents such as 2-methoxyethanol, 2-ethoxyethanol, or 1-methoxy-2-propanol, ketone based solvents such as acetone, methyl ethyl ketone, methyl isobutyl ketone, methyl propyl ketone, or cyclohexanone, ether based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, or diethylene glycol-2-ethylhexyl ether, aromatic solvents such as benzene, toluene or xylene, etc. can be used alone or in combination.

In addition to the above components, the hard coating composition may further include at least one additive commonly used in the art to which the present invention belongs, such as antioxidants, coating aids, surfactants, anti-yellowing agents, and antifouling agents. Further, since the content can be variously adjusted within a range that does not deteriorate the physical properties of the hard coating film of the present invention, it is not particularly limited, but for example, it may be included in an amount of about 0.1 to about 10 parts by weight with respect to 100 parts by weight of the siloxane resin.

For example, the antioxidant may include one or more mixtures selected from the group consisting of phenolic-based antioxidant, phosphate-based antioxidant, amine-based antioxidant, thioester-based antioxidant, and the like, but may not be limited thereto. The surfactant may be mono- or bifunctional fluorine-based acrylate, fluorine-based surfactant or silicon-based surfactant. In this case, the surfactant may be included in a form of being dispersed or crosslinked in the crosslinked copolymer. In addition, an anti-yellowing agent may be included as the additive, and the anti-yellowing agent may include a benzophenone-based compound or a benzotriazole-based compound. The antioxidant can be used for suppressing an oxidation reaction caused by the polymerization of the siloxane resin.

Meanwhile, the production conditions of the siloxane resin may include a step of performing condensation polymerization for 1 hour to 20 hours at a temperature of 25° C. to 100° C.

In addition, the hard coating layer may be a cured product formed on one side or both sides of the supporting substrate layer. The cured product may be a photocured product or a heat cured product. When the hard coating layer is formed on one side of the supporting substrate layer, it may be formed by a single-sided coating or two or more-layer coating. In addition, if necessary, two or more layers can be formed even when the hard coating layer is formed on both sides of the substrate layer. Most preferably, the hard coating layer may include one or more layers on only one side of the supporting substrate layer.

Further, as described above, the hard coating layer may be formed to a thickness of 50 μm to 240 μm.

The hard coating laminate can be produced by proceeding curing in accordance with a general method using a hard coat composition, and the method is not limited. The hard coating laminate formed by the above method may provide an effect of greatly improving curl characteristics in addition to high pencil hardness of 5H or more. Such a hard coating laminate refers to a flexible transparent film or a foldable transparent film, and it can be usefully used as a material for a front part, a display part and the like in various flexible or foldable display devices.

In particular, even if a hard coating layer that has progressed only once coating on the supporting substrate layer is included during the production of the hard coating laminate, the problem that the double-sided coating has to be progressed thickly as in the existing case does not occur. In addition, the present invention may provide a hard coating laminate which includes a film including one or more layers of the hard coating layer by proceeding coating once or more times, or both sides by coating the upper and lower layers of the substrate, as necessary.

Specifically, a hard coating laminate can be provided in which the hard coating composition described above is coated once or more times on one side of the supporting substrate layer, and then heat- or photocured to form one or more hard coating layers. In this case, the hard coating layer may mean a cured product of the hard coating composition described above.

In addition, the hard coating laminate may further include a hard coating layer containing a conventional acrylate-based resin on the other surface of the supporting substrate layer as necessary. In this case, the hard coating laminate may include a first hard coating layer including one or more siloxane resins formed on one surface of the supporting substrate layer and a second hard coating layer including an acrylate-based resin formed on the other surface of the supporting substrate layer. Therefore, the hard coating laminate according to one embodiment of the invention may include a substrate layer; two or three hard coating layers formed on one side of the substrate layer; and two or three hard coating layers formed on both sides of the substrate layer.

Meanwhile, in the hard coating laminate, the supporting substrate layer is used for supporting the hard coating layer and it may be a transparent plastic material commonly used in the art. As an example, since the supporting substrate layer may include a thermoplastic resin of a plastic material, a stretched film or a non-stretched film including the plastic resin may be used without any particular limitation on the production method or material thereof.

More specifically, the supporting substrate layer may include one or more thermoplastic resins selected from the group consisting of polyesters such as polyethyleneterephtalate (PET), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyamideimide (PAI), polyimide (PI), triacetylcellulose (TAC) and methyl methacrylate (MMA). The supporting substrate layer may be a single layer or a multilayer structure including two or more substrates made of the same or different materials as required, and the layer is not particularly limited.

The supporting substrate layer may be a substrate having a multilayer structure of polyethylene terephthalate (PET), or a substrate having a structure of two or more layers formed by coextrusion of polymethyl methacrylate (PMMA)/polycarbonate (PC).

Further, the supporting substrate layer may be a substrate including a copolymer of polymethyl methacrylate (PMMA) and polycarbonate (PC).

Further, the supporting substrate layer may be subjected to plasma or corona surface treatment as required, and the method is not particularly limited.

The supporting substrate layer may have a thickness of 40 to 800 μm, or 5 to 500 μm, or 100 to 200 μm. As the hard coating layer of the specific thickness of the present invention as described above is laminated on the supporting substrate layer of the said thickness range, it is possible to provide a hard coating laminate having excellent internal bending property and external bending property addition to more excellent mechanical properties.

The hard coating laminate provided by the method as described above not only exhibits a high pencil hardness of 5H or more, but also has improved adhesiveness, internal bending property, external bending property, and impact resistance.

For example, the internal bending property or external bending property of the hard coating laminate may be evaluated using a Mandrel bend test method or a dynamic folding tester according to the measurement standard JIS K5600-5-1. The internal bending property means folding so that the hard coating surface faces inward, and the external bending property means folding so that the supporting substrate layer faces inward. Further, in the dynamic folding test method, the presence or absence of cracks is confirmed by repeating folding and unfolding motions (angle of 90 degrees to 180 degrees) after setting a predetermined diameter value, thereby evaluating the bending properties.

In accordance with this method, the internal and external bending properties and external bending properties measured using the Mandrel bend test method or the dynamic folding tester according to the measurement standard JIS K5600-5-1 are excellent, thereby showing improved results over the prior art.

Advantageous Effects

The hard coating laminate of the present disclosure may be formed using a hard coating composition including an elastomeric polymer in addition to a siloxane resin of a particular structure including at least 70 mol % or more of glycidyl groups in the structure. Therefore, the present disclosure is effective in providing a hard coating laminate which exhibits a high pencil hardness of 5H or more while allowing one or more-layer or double-sided coating on one surface of the supporting substrate layer, and has excellent adhesiveness, internal bending property, external bending property and impact resistance characteristics. Therefore, the hard coating laminate of the present invention can be effectively used for the front part, the display part, and the like of the foldable display material, thereby contributing to the improvement of device performance.

Hereinafter, embodiments of the present invention will be described in more detail by way of examples. However, these examples are presented for illustrative purposes only, and are not intended to limit the scope of the present invention.

Preparation Example 1

3-Glycidoxypropyltrimethoxysilane (GPTMS, KBM-403™, Shin-Etsu) as a silane monomer, water and toluene were added to a 1000 mL 3-neck flask, mixed and stirred (GPTMS: water=1 mol: 3 mol).

Next, a basic catalyst (trimethylammonium hydroxide; TMAH) was added to the resulting mixed solution in an amount of 1 part by weight with respect to 100 parts by weight of the silane monomer and allowed to react at 100° C. for 2 hours to give a siloxane resin of the following composition containing 100 mol % of glycidoxypropyl modified silicone (hereinafter referred to as GP) (Mw: 2,800 g/mol, epoxy group equivalent: 6 mmol/g).

(in Formula 1, $R^1$ is a glycidoxypropyl group (in Formula 2, $R_a$ is —$R_b OR_c$— where $R_b$ is a propylene group and $R_c$ is a methylene group), R is a hydrogen atom or a methyl group, and a=0.97, b=0, c=0.03)

Preparation Example 2

3-Glycidoxypropyltrimethoxysilane (GPTMS, KBM-403™, Shin-Etsu) as a silane monomer, water and toluene were added to a 1000 mL 3-neck flask, mixed and stirred (GPTMS: water=1 mol: 3 mol).

Next, a basic catalyst (trimethylammonium hydroxide; TMAH) was added to the resulting mixed solution in an amount of 1 part by weight with respect to 100 parts by weight of the silane monomer and allowed to react at 100° C. for 4 hours to give a siloxane resin of the following composition containing 100 mol % of glycidoxypropyl modified silicone (hereinafter referred to as GP) (Mw: 9,500 g/mol, epoxy group equivalent: 6 mmol/g).

(in Formula 1, $R^1$ is a glycidoxypropyl group (in Formula 2, $R_a$ is —$R_b OR_c$— where $R_b$ is a propylene group and $R_c$ is a methylene group), R is a hydrogen atom or a methyl group, and a=0.98, b=0, c=0.02)

Preparation Example 3

3-Glycidoxypropyltrimethoxysilane (GPTMS, KBM-403™, Shin-Etsu) as a silane monomer, water and toluene were added to a 1000 mL 3-neck flask, mixed and stirred (GPTMS: water=1 mol: 2 mol).

Next, a basic catalyst (trimethylammonium hydroxide; TMAH) was added to the resulting mixed solution in an amount of 1 part by weight with respect to 100 parts by weight of the silane monomer and allowed to react at 100° C. for 4 hours to give a siloxane resin of the following composition containing 100 mol % of glycidoxypropyl modified silicone (hereinafter referred to as GP) (Mw: 27,000 g/mol, epoxy group equivalent: 6.0 mmol/g).

(in Formula 1, $R^1$ is a glycidoxypropyl group (in Formula 2, $R_a$ is —$R_b OR_c$— where $R_b$ is a propylene group and $R_c$ is a methylene group), R is a hydrogen atom, and a=0.94, b=0, c=0.06)

Preparation Example 4

3-Glycidoxypropyltrimethoxysilane (GPTMS, KBM-403™, Shin-Etsu) as a silane monomer, 2-(3,4-epoxycyclohexyl)ethyltrimethoxysilane (CHE, KBM-303™, Shin-Etsu), water and toluene were added to a 1000 mL 3-neck flask, mixed and stirred (GPTMS:CHE:water=0.7 mol:0.3 mol:3 mol).

Next, a basic catalyst (ammonia) was added to the resulting mixed solution in an amount of 1 part by weight with respect to 100 parts by weight of the silane monomer and allowed to react at 100° C. for 2 hours to give a siloxane resin of the following composition (Mw: 3,000 g/mol, epoxy group equivalent: 5.9 mmol/g).

(in Formula 1, $R^1$ is a glycidoxypropyl group (in Formula 2, $R_a$ is —$R_bOR_c$— where $R_b$ is a propylene group and $R_c$ is a methylene group), $R^2$ is a 2-(3,4-epoxycyclohexyl)ethyl group, R is a hydrogen atom, and a=0.7, b=0.3, c<0.01)

Preparation Example 5

3-Glycidoxypropyltrimethoxysilane (GPTMS, KBM-403™, Shin-Etsu) as a silane monomer, phenyltrimethoxysilane (PTMS, Shin-Etsu), water and toluene were added to a 1000 mL 3-neck flask, mixed and stirred (GPTMS:PTMS: water=0.7 mol:0.3 mol:3 mol). Herein, a small amount of the reaction material was disappeared in the process of synthesizing the siloxane resin, and the ratio composition of the final material to the input equivalent ratio may be changed slightly compared to the range of the input equivalent ratio.

Next, a basic catalyst (ammonia) was added to the resulting mixed solution in an amount of 1 part by weight with respect to 100 parts by weight of the silane monomer and allowed to react at 100° C. for 2 hours to give a siloxane resin of the following composition (Mw: 3,000 g/mol, epoxy group equivalent: 4.5 mmol/g).

$$(R^1SiO_{3/2})_a(R^2SiO_{3/2})_b(O_{1/2}R)_c \qquad (1)$$

(in Formula 1, $R^1$ is a glycidoxypropyl group (in Formula 2, $R_a$ is —$R_bOR_c$— where $R_b$ is a propylene group and $R_c$ is a methylene group), $R^2$ is a phenyl group, R is a hydrogen atom or a methyl group, and a=0.8, b=0.2, c<0.01)

Preparation Example 6

3-Glycidoxypropyltrimethoxysilane (GPTMS, KBM-403™, Shin-Etsu) as a silane monomer, 2-(3,4-epoxycyclohexyl)ethyltrimethoxysilane (CHE, KBM-303™, Shin-Etsu), water and toluene were added to a 1000 mL 3-neck flask, mixed and stirred (GPTMS:CHE:water=0.5 mol:0.5 mol:3 mol).

Next, a basic catalyst (ammonia) was added to the resulting mixed solution in an amount of 1 part by weight with respect to 100 parts by weight of the silane monomer and allowed to react at 100° C. for 2 hours to give a siloxane resin of the following composition (Mw: 3,000 g/mol, epoxy group equivalent: 5.8 mmol/g).

$$(R^1SiO_{3/2})_a(R^2SiO_{3/2})_b(O_{1/2}R)_c \qquad (1)$$

(in Formula 1, $R^1$ is a glycidoxypropyl group (in Formula 2, $R_a$ is —$R_bOR_c$— where $R_b$ is a propylene group and $R_c$ is a methylene group), $R^2$ is a phenyl group, is a hydrogen atom, and a=0.5, b=0.5, c<0.01)

Preparation Example 7

3-Glycidoxypropyltrimethoxysilane (GPTMS, KBM-403™, Shin-Etsu) as a silane monomer, water and toluene were added to a 1000 mL 3-neck flask, mixed and stirred (GPTMS: water=1 mol: 2 mol).

Next, a basic catalyst (trimethylammonium hydroxide; TMAH) was added to the resulting mixed solution in an amount of 1 part by weight with respect to 100 parts by weight of the silane monomer and allowed to react at 100° C. for 6 hours to give a siloxane resin of the following composition containing 100 mol % of glycidoxypropyl modified silicone (hereinafter referred to as GP) (Mw: 50,000 g/mol, epoxy group equivalent: 6.0 mmol/g).

$$(R^1SiO_{3/2})_a(R^2SiO_{3/2})_b(O_{1/2}R)_c \qquad (1)$$

(in Formula 1, $R^1$ is a glycidoxypropyl group (in Formula 2, $R_a$ is —$R_bOR_c$— where $R_b$ is a propylene group and $R_c$ is a methylene group), R is a hydrogen atom, and a=1, b=0, c<0.01)

TABLE 1

|  |  | Preparation Example 1 | Preparation Example 2 | Preparation Example 3 | Preparation Example 4 | Preparation Example 5 | Preparation Example 6 | Preparation Example 7 |
|---|---|---|---|---|---|---|---|---|
| Molar ratio of synthetic raw materials (%) | GPTMS | 100 | 100 | 100 | 70 | 70 | 50 | 100 |
|  | CHE |  |  |  | 30 |  | 50 |  |
|  | PTMS |  |  |  |  | 30 |  |  |
| Weight average molecular weight(g/mol) |  | 2800 | 9500 | 27000 | 3000 | 3000 | 3000 | 50000 |

Examples 1 to 8

Hard Coating Composition

The hard coating compositions of Examples 1 to 8 were prepared using 100 parts by weight of the siloxane resins of Preparation Examples 1 to 5, an elastomeric polymer (polycaprolactonediol, Mn 530, Sigma Aldrich), an initiator, and an organic solvent. Herein, Irgacure-250 (BASF) was used as the initiator.

Manufacture of Hard Coating Laminate

Each hard coating composition was applied to only one side of a PET substrate having a size of 15 cm×20 cm and a thickness of 188 μm. Next, photocuring was performed using a UV lamp (irradiation dose: 1000 mJ/cm²) to manufacture a hard coating laminate including a hard coating layer having a coating thickness of 80 μm or 50 μm or 150 μm.

Comparative Examples 1 to 4

The hard coating compositions of Comparative Examples 1 to 4 were produced in the same manner as in Example 1 by using the siloxane resins of Preparation Examples 6 to 7, or using an unimolecular epoxy resin instead of the siloxane resin, respectively, and then the hard coating laminate was manufactured.

Comparative Example 5

A hard coat laminate was manufactured in the same manner as in Example 1, except that the content of the elastomeric polymer in the hard coating composition was changed to 10 parts by weight.

Comparative Example 6

A hard coat laminate was manufactured in the same manner as in Example 1, except that the content of the elastomeric polymer in the hard coating composition was changed to 100 parts by weight.

Comparative Example 7

A hard coat laminate was manufactured in the same manner as in Example 1, except that the thickness of the hard coating layer was changed to 30 μm.

Experiment Method

Physical Property Test
1) Pencil Hardness

The hard coating laminates of Examples and Comparative Examples were measured according to pencil hardness using a pencil hardness tester, and the hardness without scratches was confirmed after moving the pencil back and forth three times.
Pencil moving speed: 300 mm/min
Pencil moving distance: 30 mm
Vertical load: 750 g
2) Internal Bending Property In order to evaluate the flexibility of the hard coating laminate, the appearance when folded to the inside of the surface formed with the hard coating layer to have a radius of 2.5 mm (2.5 R) using a dynamic folding machine tester was observed.

That is, when 200,000 times repeated folding and unfolding motions at 25° C. to the inside of the surface of the hard coating layer of the hard coating laminate to have a radius of 2.5 mm, whether or not cracking occurred was confirmed, and then the internal bending property was evaluated according to the following criteria.

If cracks of more than 5 mm have not occurred: excellent/ if cracks have occurred: poor
3) External Bending Property In order to evaluate the external bending and flexibility of the hard coating laminate, the appearance when folded to the outside of the surface of the hard coating layer formed on the upper part of the supporting substrate layer using a dynamic folding machine tester was observed.

That is, when 200,000 times repeated folding and unfolding motions at 25° C. to the inside of the surface coated on the supporting substrate layer for hard coating layer formation or the lower part thereof faces inwardly, whether or not cracking occurred was confirmed, and then the external bending property was evaluated according to the following criteria.

The inner curvature radius R of the folded part was measured and the value of the smallest curvature radius R in which no crack occurred was confirmed.
4) Impact Resistance The impact resistance of the hard coating laminate was measured by the method using Ball Drop (SUS ball 22 g).

TABLE 2

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Siloxane resin | Preparation Example 1 (100) | Preparation Example 2 (100) | Preparation Example 3 (100) | Preparation Example 4 (100) | Preparation Example 5 (100) | Preparation Example 6 (100) | Preparation Example 7 (100) | Gp-D4** (100) | BPA-Gp*** (100) |
| Elastomeric | 20 | 20 | 20 | 20 | 20 | 20 | 20 | 20 | 20 |
| Coating thickness (cm) | 100 | 100 | 100 | 100 | 100 | 100 | 100 | 50 | 70 |
| Pencil harness | 8H | 7H | 6H | 8H | 6H | 8H | 3H | Poor in Adhesiveness-Hardness measurement not possible | |
| Internal bending property | Excellent | Excellent | Excellent | Excellent | Excellent | Excellent | Excellent | — | |

Note)
* Content (part by weight) of elastomeric polymer relative to 100 parts by weight siloxane resin
**Gp-D4: (2,4,6,8-Tetramethyl-2,4,6,8-tetrakis(propyl glycidyl ether)cyclotetrasiloxane)
***BPA-Gp: (1,3-Bis(3-glycidyloxypropyl)tetramethyldisiloxane)

TABLE 3

| | Example 1 | Example 6 | Example 7 | Example 8 | Comparative Example 5 | Comparative Example 6 | Comparative Example 7 |
|---|---|---|---|---|---|---|---|
| Siloxane resin | Preparation Example 1 (100) | Preparation Example 1 (100) | Preparation Example 1 (100) | Preparation Example 1 (100) | Preparation Example 1 (100) | Preparation Example 1 (100) | Preparation Example 1 (100) |

TABLE 3-continued

| | Example 1 | Example 6 | Example 7 | Example 8 | Comparative Example 5 | Comparative Example 6 | Comparative Example 7 |
|---|---|---|---|---|---|---|---|
| Elastomeric polymer | 20 | 50 | 20 | 20 | 10 | 100 | 20 |
| Coating thickness (μm) | 80 | 80 | 50 | 150 | 80 | 80 | 30 |
| Pencil hardness | 8H | 5H | 6H | 8H | 8H | 2H | 3H |
| Internal bending property | Excellent | Excellent | Excellent | Excellent | Excellent | Excellent | Excellent |
| External bending property | 4R | 3R | 3R | 5R | poor | 3R | 3R |
| Impact resistance | 15 cm | 15 cm | 10 cm | 20 cm | 15 cm | 5 cm | 5 cm> |

* Content (part by weight) of elastomeric polymer relative to 100 parts by weight siloxane resin Looking at the results in Tables 2 and 3 above, since Examples 1 to 8 specifically include a siloxane resin of Chemical Formula 2 including a glycidoxy containing at least 70 mol % or more of the repeating units of Chemical Formula 1, and an elastomeric polymer in a certain percentage range, they showed the hardness equal to or higher than Comparative Examples 1-7, and was excellent in all of internal bending property, external bending property, and impact resistance characteristics.

In particular, the above Examples can be used effectively for the foldable display material because no crack occurs in the test of the internal bending property and the external bending property.

Herein, in the case of Comparative Examples 6 and 7, both the internal bending property and the external bending property were excellent, but the pencil hardness was significantly lower than 3H, and the impact resistance was also poor.

The invention claimed is:

1. A hard coating laminate having an internal bending property and an external bending property comprising:
   a supporting substrate layer; and
   a hard coating layer formed on the supporting substrate layer,
   wherein the hard coating layer has a thickness of 70 to 200 μm and includes a cured product of a resin composition including a siloxane resin and an elastomeric polymer,
   wherein the elastomeric polymer is contained in an amount of 20 to 80 parts by weight based on 100 parts by weight of the siloxane resin,
   wherein the elastomeric polymer comprises a polycaprolactone polyol having a number average molecular weight (Mn) of 300 or more and 530 or less, and
   wherein the siloxane resin comprises a compound represented by the following Chemical Formula 2, $(R^1SiO_{3/2})_a(R^2SiO_{3/2})_b(O_{1/2}R)_c$      [Chemical Formula 2]

wherein, in the Chemical Formula 2,
   R is a hydrogen atom or an alkyl group having 1 to 20 carbon atoms,
   $R^1$ is a functional group represented by the following Chemical Formula a,
   a repeating unit including the substituent $R^1$ is included in an amount of 70 mol % to 98 mol %, based on the total molar content of the Chemical Formula 2,
   $R^2$ is selected from the group consisting of a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 6 to 20 carbon atoms, a substituted or unsubstituted arylalkyl group having 7 to 20 carbon atoms, a substituted or unsubstituted alkylaryl group having 7 to 20 carbon atoms, an epoxy group, a hydrogen atom, an amino group, a mercapto group, an ether group, an ester group, a carbonyl group, a carboxyl group and a sulfone group, and
   a/(a+b)≥0.7, where a is a positive number and b and c are each independently 0 or a positive number, with the proviso that b and c are not simultaneously 0;

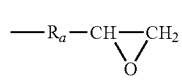
[Chemical Formula a]

wherein in the Chemical Formula a,
$R_a$ is a substituted or unsubstituted alkylene group having 1 to 6 carbon atoms, or —$R_b$O$R_c$— where $R_b$ and $R_c$ are each independently a single bond or a substituted or unsubstituted alkylene group having 1 to 6 carbon atoms.

2. The hard coating laminate according to claim 1, wherein the hard coating laminate has an internal bending property of generating no cracks on the hard coating laminate when 200,000 times repeated folding and unfolding of the hard coating laminate at 25° C. toward the inside a surface of the hard coating layer at an angle of 90 degrees so that the surface of the hard coating layer faces with each other based on the middle of the hard coating laminate.

3. The hard coating laminate according to claim 1, wherein the hard coating laminate has an external bending property of generating no cracks on the hard coating laminate when 200,000 times repeated folding and unfolding of the hard coating laminate at 25° C. toward the outside of a surface of the hard coating layer at 90 degrees so the supporting substrate layer faces inwardly based on the middle of the hard coating laminate.

4. The hard coating laminate according to claim 1, wherein the elastomeric polymer is contained in an amount of 20 to 70 parts by weight with respect to 100 parts by weight of the siloxane resin.

5. The hard coating laminate according to claim 1, wherein in the Chemical Formula a, $R_a$ is a substituted or unsubstituted alkylene group having 1 to 6 carbon atoms, or —$R_b OR_c$— where $R_b$ and $R_c$ are each independently a single bond or a substituted or unsubstituted alkyl having 1 to 3 carbon atoms.

6. The hard coating laminate according to claim 1, wherein in the Chemical Formula 2, $R^1$ is a glycidoxypropyl group.

7. The hard coating laminate according to claim 1, wherein in the Chemical Formula 2, R is an alkyl group having 1 to 10 carbon atoms, $R^1$ includes a glycidoxypropyl group, and $R^2$ is an alkyl group having 1 to 10 carbon atoms, an aryl group or an epoxy group having 6 to 20 carbon atoms.

8. The hard coating laminate according to claim 1, wherein the siloxane resin has a weight average molecular weight of 1,000 to 10,000 g/mol.

9. The hard coating laminate according to claim 1, wherein the elastomeric polymer further comprises at least one polyol selected from alkanediol, polyolefin polyol, polyester polyol, polyether polyol and polycarbonate polyol.

10. The hard coating laminate according to claim 1, wherein the supporting substrate layer comprises one or more thermoplastic resins selected from the group consisting of polyethyleneterephtalate, cyclic olefin copolymer, polyacrylate, polycarbonate, polyethylene, polymethylmethacrylate, polyetheretherketon, polyethylenenaphthalate, polyetherimide, polyamideimide, polyimide, triacetylcellulose and methyl methacrylate.

11. The hard coating laminate according to claim 1, wherein the supporting substrate layer has a thickness of 40 to 800 μm.

12. The hard coating laminate according to claim 1, wherein a ratio of the thickness of the hard coating layer relative to the thickness of the supporting substrate layer is 25% to 100%.

* * * * *